United States Patent Office 3,728,194
Patented Apr. 17, 1973

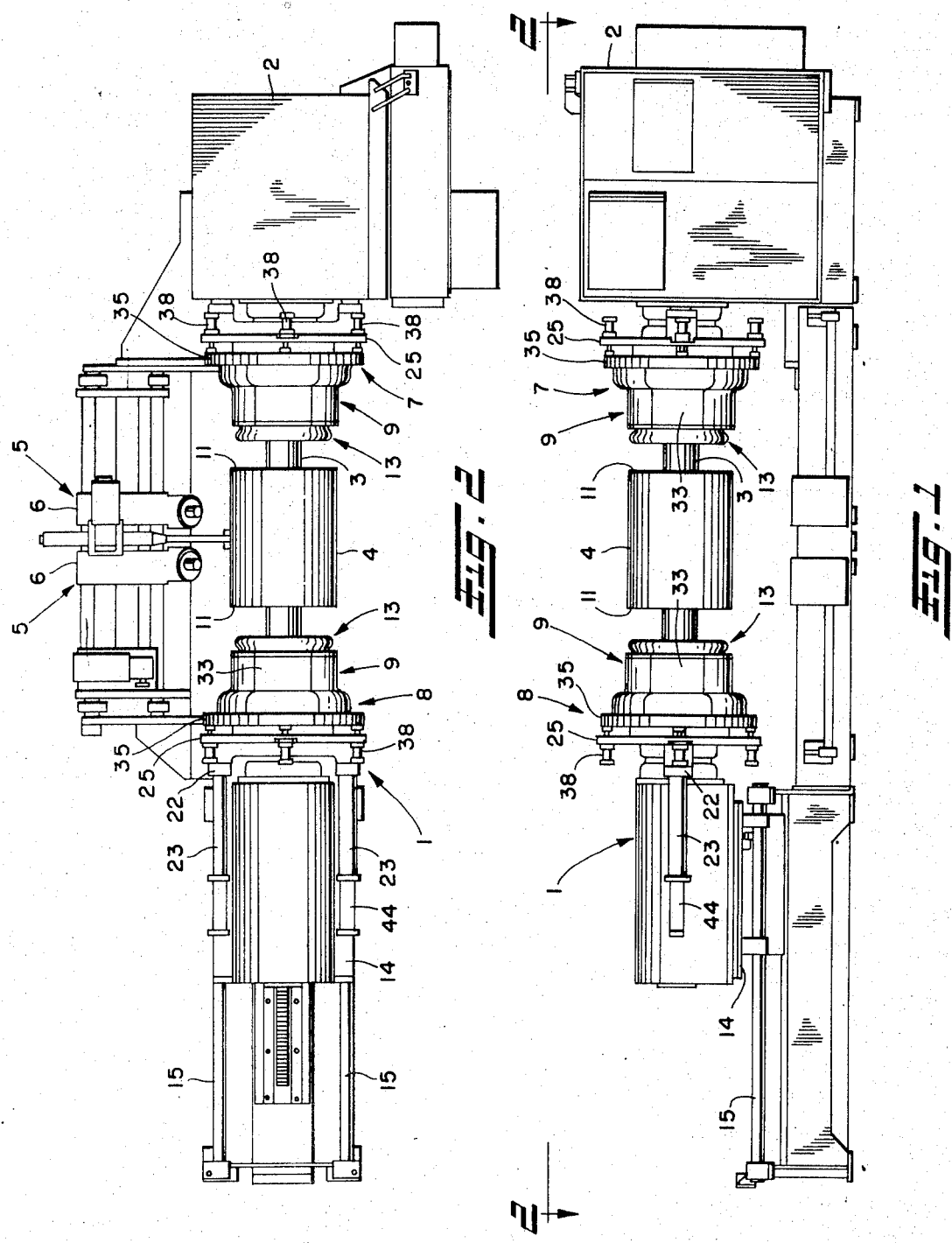

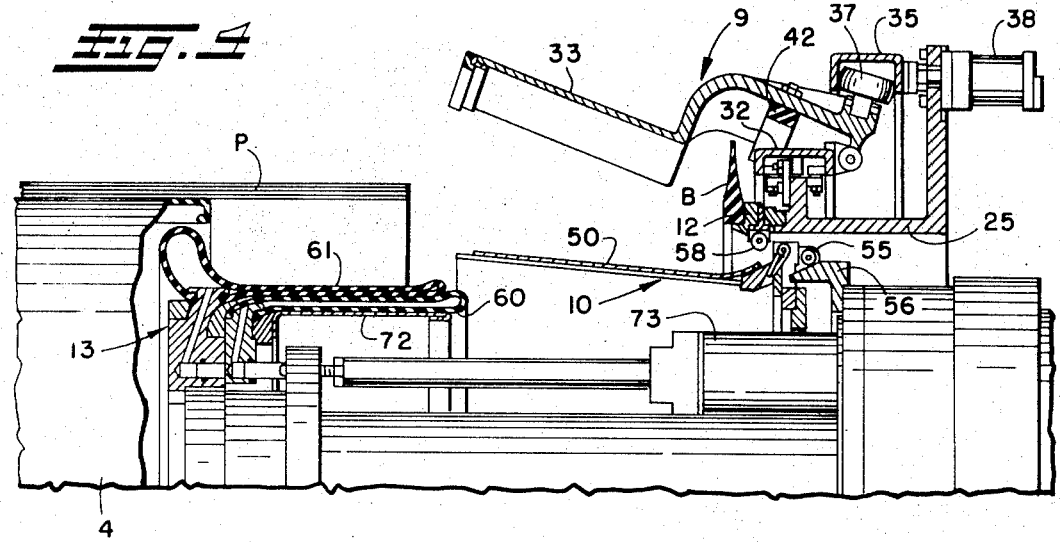
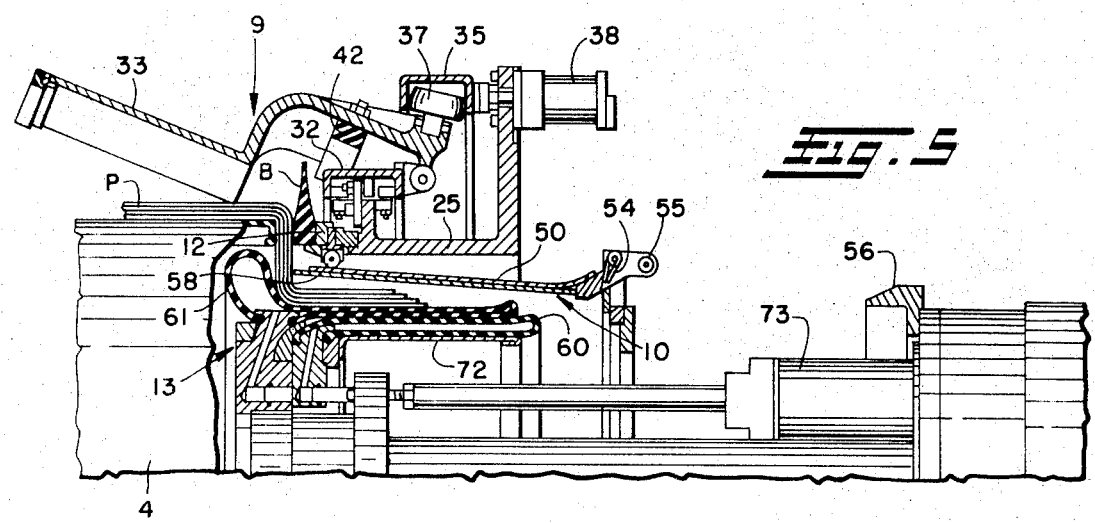
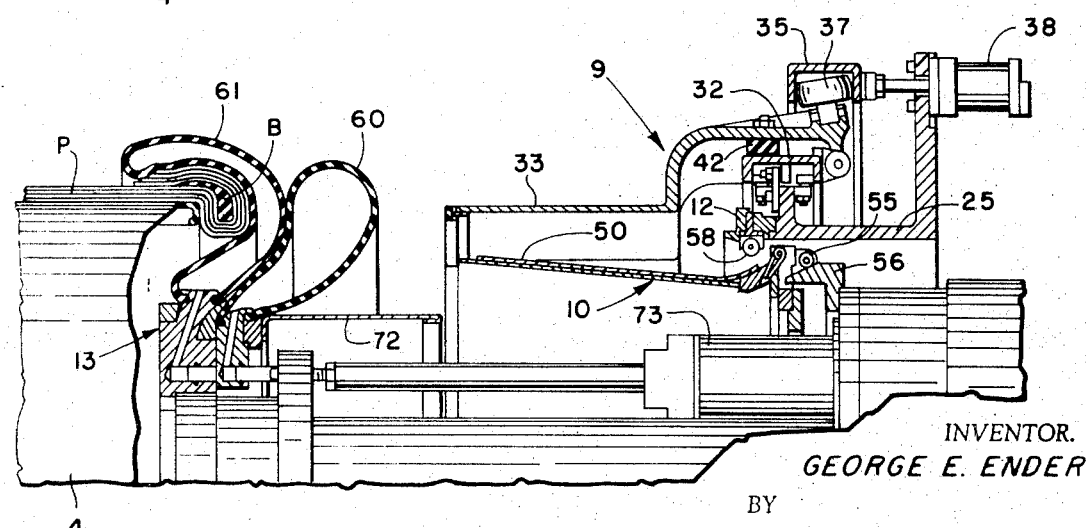

3,728,194
ROTATING EXPANDABLE PLY RING
MECHANISM
George E. Enders, Salem, Ohio, assignor to NRM
Corporation, Akron, Ohio
Filed Nov. 27, 1970, Ser. No. 93,103
Int. Cl. B29h 17/16, 17/22
U.S. Cl. 156—400
19 Claims

ABSTRACT OF THE DISCLOSURE

Ply ring mechanism consists of a plurality of ring segments which are adapted to be disposed adjacent the ends of a tire building drum for supporting the overhanging ply edges during stitching of the plies together. The ply ring segments are pressed into frictional engagement with the ends of the drum for rotation therewith during wrapping of the plies around the drum and subsequently retracted to provide adequate clearance for the ply turn-down, ply turn-up and other operations. The ply ring segments are also pivotally mounted at their axial outer ends to permit the ring segments to be expanded radially outwardly to clear the tire beads stored therein and adjacent end of the drum when setting the tire beads against the turned-down ply edges, such ply ring segments having a stepped contour to accommodate the long flippers on the beads during wrapping of the tire plies around the drum and ply ring segments disposed adjacent the ends of the drum.

---

This invention relates generally as indicated to a rotating expandable ply ring mechanism for use in supporting the overhanging edges of tire plies belond the ends of a tire building drum during stitching and splicing of the tire plies together.

In the manufacture of certain types of tires, it is conventional practice to wrap the tire plies around a radially collapsible rotating tire building drum with the edges of the tire plies extending beyond the ends of the drum so that the ply edges may be turned down over the drum ends for setting of the tire beads against the turned-down ply edges. Afterwards, the ply edges are turned about the tire beads and the usual chafer straps, breaker strips, tread stock and like components may be applied. A typical example of a tire building machine used to manufacture tire carcasses in this manner is shown in U.S. Pat. No. 3,438,832, granted to Armindo Cantarutti on Apr. 15, 1969, wihch is incorporated herein by way of reference.

In general, tire building machines of this general type have been found to operate quite satisfactorily, but heretofore no provision was made for supporting the overhanging ply edges during stitching of the plies together prior to ply turn-down, and in the manufacture of certain types of tires and particularly truck tires the amount of overhang of the plies may be such that additional support is desirable or necessary to obtain proper stitching of the plies.

It is accordingly a principal object of this invention to provide a tire building machine including additional support means for supporting the overhanging ply edges during stitching of the plies together prior to ply turn-down.

Another object is to provide such a tire building machine in which the ply support mechanism for the overhanging plies is contoured to provide clearance for the storage of tire beads with long flippers during wrapping of the tire plies around the drum and ply support mechanism and stitching of the plies.

Still another object is to provide such a tire building machine in which the ply support mechanism may be expanded radially outwardly to permit insertion of the tire bead therewithin and setting of the tire bead against the turn-down plies at the ends of the drum.

Another object is to provide such a tire building machine in which the ply support mechanism is axially movable away from the drum to provide clearance for the subsequent ply turn-down, bead setting, and ply turn-up operations.

Yet another object is to provide such a tire building machine in which the ply support mechanism for the overhanging tire plies rotates with the tire building drum during application of the plies thereto.

Still another object is to provide such a tire building machine with ply turn-down fingers which are mechanically latched against radial outward expansion when in their axial retracted positions so as not to interfere with the ply supporting and bead setting operations.

Another object is to provide such a tire building machine with ply turn-up mechanism which may be retained against axial movement when positioned adjacent the ends of the tire building the ply turn-up mechanism axially outwardly.

A further object is to provide a tire building machine of compact design in which the various ply support, ply turn-down, and ply turn-up mechanisms are slideably mounted on a common support to facilitate removal and replacement of the various mechanisms with different size mechanisms for manufacturing different size tires on the same machine.

These and other objects of the present invention may be achieved by providing a tire building machine with ply ring mechanisms adjacent the ends of the tire building drum for supporting the overhanging ply edges during stitching. The ply ring mechanisms are retractable from the ends of the drum to provide adequate clearance for the subsequent ply turn-down, ply turn-up and other operations, and consist of a plurality of ply ring segments pivotally mounted at their axial outer ends to permit radial expansion of the ring segments to clear the tire beads and adjacent ends of the drum for setting of the tire beads against the turned-down ply edges. The ply ring segments are contoured to accommodate the tire beads with long flippers attached which are stored therewithin during wrapping of the tire plies around the drum with the ends of the ply ring segments pressed against the ends of the drum to provide frictional contact causing the ply ring segments to rotate with the drum.

Suitable cam mechanism may be provided for latching the ply turn-down fingers against radical outward expansion when retracted to prevent the ply turn-down fingers from interfering with axial movements of the ply ring mechanism and bead ring carried thereby. The various ply turn-down and ply turn-up mechanisms may also be axially movable on a common support to permit ready removal and replacement with different size mechanisms for use in manufacturing different size tires. Retention of the ply turn-up mechanism in place adjacent the ends of the drum may be obtained by closing a valve which admits oil to the actuating cylinder for moving the ply turn-up mechanism axially.

Although the tire building machine of the present invention is primarily designed for use in manufacturing truck tires, it will be understood that such machine may also be used in the manufacture of passenger tires as well whenever it is desirable or necessary to provide additional support for the overhanging ply edges.

To the accomplishment of the foregoing and related ends, the invention, then comprises the feaeures hereinafter fully described and particularly pointed out in the claims, the following description and the annexed drawing setting forth in detail a certain illustrative embodiment of the invention, this being indicative, however, of but one of the various ways in which the principle of the invention may be employed.

In the annexed drawings:

FIG. 1 is a schematic front elevation view of a preferred form of tire bulding machine constructed in accordance with this invention;

FIG. 2 is a schematic top plan view of the tire building machine of FIG. 1 as seen from the plane of the line 2—2 thereof;

Figure 3:
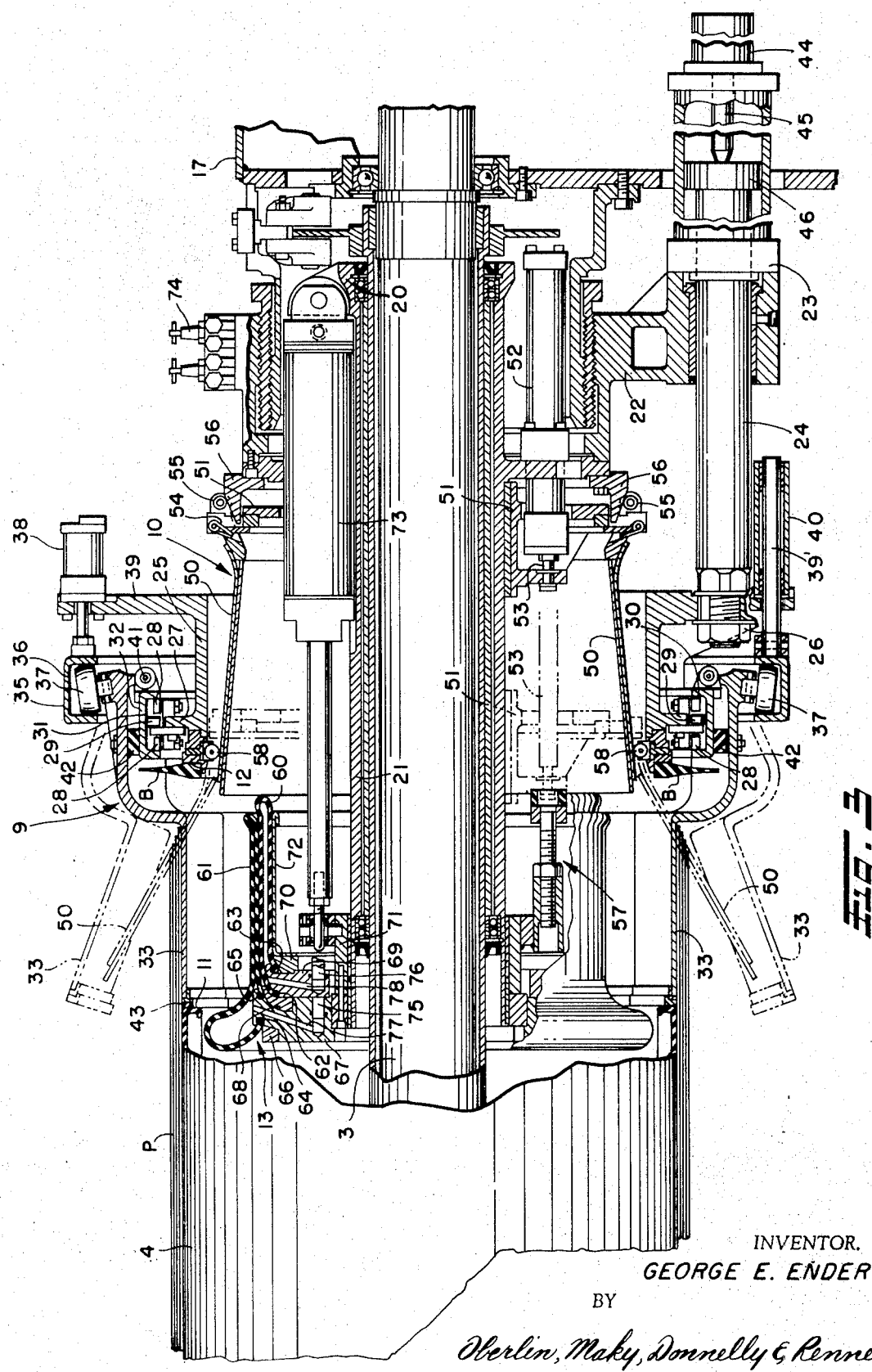

FIG. 3 is an enlarged fragmentary longitudinal section through the ply ring mechanism, ply turn-down mechanism, ply turn-up mechanism, and associated support structure at one end of the tire building machine; and FIGS. 4 through 8 are fragmentary schematic longitudinal sections similar to FIG. 3, but illustrating the preferred sequence of operation of the tire building machine of the present invention during the manufacture of a tire carcass.

Referring now in detail to the drawings, and first especially to FIGS. 1 and 2, there is shown by way of example a tire building machine 1 in accordance with this invention including a main drive housing 2 at one end containing the necessary controls for operating the machine as required. Projecting from the main housing 2 is a drum shaft 3 on which is mounted a tire building drum 4 of the usual collapsible type to permit removal of the finished tire carcass therefrom. At the front of the machine 1 there is provided a pair of tread stitcher assemblies 5 mounted on carriages 6 for longitudinal movement toward and away from each other for stitching of the tire plies in place on the drum in conventional manner. Bead stitching assemblies, not shown, may also be provided at each end of the drum 4 for tucking additional plies underneath the tire beads as disclosed, for example, in the aforementioned Cantarutti U.S. Pat. 3,438,832.

Referring further to FIGS. 1 and 2 and also to FIG. 3, mounted adjacent opposite ends of the tire building drum 4 are inboard and outboard assemblies 7 and 8 each containing a ply ring mechanism 9 for supporting the overhanging edges of the tire plies P during stitching, a ply turn-down mechanism 10 for turning the overhanging ply edges down over the drum ends 11, a bead ring 12 for supporting and setting the tire beads B against the turned-down plies, and a ply turn-up mechanism 13 for wrapping the turned-down plies about the beads, in a manner to be more fully described hereafter. The outboard assembly 8 is shown mounted on a carriage 14 for movement along guide rails 15 parallel to the axis of the tire building drum for movement of the entire assembly 8 toward and away from the adjacent end of the drum thus to permit the finished tire carcass to be removed from the machine and additional tire beads B to be stored in each of the assemblies 7 and 8 for use in making the next tire carcass. Movement of the carriage 14 for the outboard assembly 8 may be obtained by providing a stationary rack 16 between the guide rails 15 engaged by a motor driven pinion on the carriage, or a pneumatic cylinder may be provided for that purpose.

The inboard assembly 7 may also be mounted for axial movement toward and away from the adjacent end of the tire building drum 4 is desired, but in the embodiment shown the main housing 17 for the inboard assembly 7 is fixed and only the mechanisms, 9, 10, 12 and 13 supported thereby are axially movable. Otherwise, the details of construction and operation of the inboard and outboard assemblies 7 and 8 are substantially identical, and accordingly only the inboard assembly 7 will be described in detail.

As best seen in FIG. 3, the inboard assembly 7 includes a bearing-mounted support 20 on the drum shaft 3 attached at its axial outer end to the fixed housing 17 and having a sleeve portion 21 on its axial inner end on which the ply turn-down mechanism 10 and ply turn-up mechanism 13 are axially slidably received. Fixed to the support 20 adjacent the outer end of the sleeve portion 21 is a mounting flange 22 for a pair of large tandem cylinders 23, one on each side of the machine. The rods 24 for the tandem cylinders 23 are fastened to an annular support ring 25 for the ply ring mechanism 9 by a pair of nuts 26 which facilitate ready removal and replacement of the ply ring mechanism 9 as desired. A radial flange 27 on the support ring 25 has a plurality of cam rollers 28 and 29 thereon engageable with the sides 30 and bottom 31 of a channel-shaped guide ring 32 thus to support the guide ring 32 for rotation about the support ring 25.

Pivotally mounted on the guide ring 32 in circumferentially spaced relation are a plurality of ring segments 33 which when moved to their radial innermost position against the adjacent end 11 of the tire building drum 4 as shown in solid lines in FIG. 3 an annular support for overhanging edges of the tire plies P. Although six such ring segments 33 are preferred, it will be apparent that a greater or lesser number of ring segments may be used as desired.

The ring segments 33 may have a stepped contour adjacent their axial outer ends to provide sufficient clearance for storing of tire beads B with long flippers thereon within the ring segments during wrapping of the tire plies around the drum 4 while the innermost edges of the ring segments are in engagement with the end of the drum providing support for the overhanging edges of the plies as aforesaid. Each tire bead B is carried by a bead setting ring 12 mounted on the axial inner end of the support ring 25 for axial movement therewith. Due to the pivotal mounting of the ring segments 33 on the guide ring 32, such ring segments 33 may be expanded radially outwardly to permit placement of the bead B on the bead ring 12 and removal therefrom during setting of the bead against the turned-down plies in a subsequent operation to be later described.

To effect such pivotal movement of the ring segments 33, there is desirably provided a second guide ring 35 radially outwardly of the first guide ring 32 having a radially inwardly opening channel or groove 36 for receipt of cam rollers 37 on the ring segments. The second guide ring 35 is axially movable with respect to the annular support ring 25 by a plurality of cylinders 38, four being preferred, mounted on a radial flange 39 at the axial outer end of the support ring.

A plurality of axially outwardly extending guide pins 39' may also be provided on the second guide ring 35 received in axially extending guides 40 on the radial flange 39 for guiding the second guide ring 35 during axial movement thereof. As apparent, axial inward movement of the second guide ring 35 will cause the ring segments 33 to swing radially inwardly about their respective pivots 41 to form a substantially continuous annular support as shown in FIGS. 1–3, whereas axial outward movement of the second guide ring 35 will cause the ring segments to expand to their radial outermost positions clearing the flipper on the tire bead and adjacent end of the drum 4 as shown in FIGS. 4 and 5. A stop 42 may be provided on the ring segments 33 for engagement with the first guide ring 32 to properly locate the ring segments in their radial innermost position shown in FIG. 3.

Because of the rotational mounting of the first guide ring 32 on the support ring 25 and the cam roller 37 connection between the ring segments 33 and second guide ring 35, the ring segments 33 are free to rotate with the tire building drum by frictional contact therewith which is enhanced by providing rubber strip facings or pads 43 on the inner ends of the ring segments. Extensions of different lengths may also be attached to the inner ends of the ring segments 33 to accommodate different lengths of ply material as desired.

During application of the tire plies P to the drum 4, the axial inner ends of the ring segments 33 may be maintained in frictional engagement with the ends of the drum by actuation of a pair of small cylinders 44 connected to the outer ends of the large tandem cylinders 23 with their rods 45 extending through the blind ends of the tandem cylinders and pressing against the tandem cylinder pistons 46 as shown in FIGS. 1–3. The stroke of the small cylinders 44 may be selected to cause movement of the ring segments 33 from their fully retracted position shown in FIGS. 4 and 6 to their intermediate position shown in FIG. 3 with the axial innermost edges of the ring segments in engagement with the ends of the drum as aforesaid. By locating the pivot pins 41 for the ring segments 33 radially outwardly of the axial inner ends of the ring segments when in their radial innermost position as shown in FIG. 3, the axial pressure applied by the small cylinders 44 urging the ring segments against the ends of the drum will maintain the ring segments in the closed cylindrical condition during application of the tire plies to the drum.

After the tire plies have been wrapped around the drum and stitched together, the ring segments 33 may be retracted to the FIG. 4 position by retraction of the rods 24 for the large tandem cylinders 23 preparatory to turning of the overhanging ply edges downwardly over the ends of the drum by actuation of the ply turn-down mechanism 10 as described hereafter. During such retraction of the rods 24 their movement is cushioned by the small cylinders 44.

As shown, the ply turn-down mechanism 10 consists of a plurality of ply turn-down fingers 50 each pivotally mounted in circumferentially spaced relation to a spider-like support member 51 axially slidably received on the sleeve portion 21 of the bearing-mounted support 20. Axial movement of the ply turn-down fingers 50 toward and away from the adjacent end of the drum 4 is obtained by actuation of a plurality of cylinders 52 fixed with respect to the sleeve 21 and having their rods 53 connected to the spider support. The ply turn-down fingers 50 are urged toward their radial outermost positions shown in FIG. 4 as by means of torsion springs 54 or the like when the ply ring mechanism 9 is clear of the ply turn-down fingers and the ply turn-down fingers are moved axially inwardly from their axial outermost positions. In the fully retracted position of the ply turn-down fingers 50 illustrated in FIG. 3, the ply turn-down fingers are retained in their radial innermost positions by engagement of rollers 55 on the axial outer ends of the ply turn-down fingers with a stationary cam member 56 fixed to the mounting flange 22 on the support 20. With the ply turn-down fingers 50 positively retained in their radial innermost positions, the ply ring mechanism 9 and tire bead ring 12 carried thereby are free to move axially in either direction without interference by the ply turn-down fingers.

Before ply turn-down can be accomplished, the ply ring mechanism 9 must be retracted and the ring segments 33 expanded radially outwardly as shown in FIG. 4 to provide sufficient clearance for radial outward expansion of the ply turn-down fingers 50 by the torsion springs 54 during axial inward movement of the ply turn-down fingers out of engagement with the fixed cam member 56. Proper positioning of the ply turn-down fingers 50 with respect to the adjacent end of the drum 4 may be obtained by providing an adjustable stop 57 on the ply turn-up mechanism 13 which limits the axial inward movement of the support member 51 for the ply turn-down fingers as shown in phantom lines in FIG. 3.

When the ply turn-down fingers 50 are in their axial innermost positions shown in phantom lines in FIG. 3 with the fingers overlying the overhanging edges of the tire plies P, the ply ring mechanism 9 is caused to move axially inwardly by actuation of the large tandem cylinders 23. During such movement rollers 58 on the support ring 25 for the ply ring mechanism 9 engage the outer surface of the ply turn-down fingers 50 causing them to pivot radially inwardly, turning the overhanging ply edges downwardly over the adjacent end of the drum 4 as shown in FIG. 5. Continued axial inward movement of the ply ring mechanism 9 causes the tire bead B carried by the bead ring 12 to be firmly pressed against the turned down plies for setting of the tire bead in place. Afterwards both the ply ring mechanism 9 and ply turn-down mechanism 10 are retracted to the FIG. 6 position to provide clearance for actuation of the ply turn-up mechanism 13 which desirably consists of a pair of inflatable inner and outer annular bladders 60 and 61 whose beads 62, 63 and 64, 65 are clamped between a plurality of rings 66–70 carried by a cylindrical support 71 axially slidably received on the bearing-mounted sleeve 21 for axial movement toward and away from the adjacent end of the drum.

With the inner and outer bladders 60 and 61 deflated as shown in FIG. 3, the inner bladder 60 extends axially outwardly from the bead clamping rings 66–70 and is supported in flattened condition by a sheet metal annular support 72 attached to the axial outermost bead clamping ring 70. The outer bladder 61 when deflated also extends axially outwardly and is supported in flattened condition by the annular support 72 in overlying relation to the inner bladder 60.

Proper positioning of the ply turn-up mechanism 13 with respect to the adjacent end of the drum 4 is obtained by actuation of a plurality of cylinders 73 fixed to the bearing-mounted support 20. The cylinders 73 for moving the ply turn-up mechanism 13 are desirably oil operated, whereby when the ply turn-up mechanism 13 is properly located axially with respect to the inner end of the drum, the valves 74 for controlling oil flow to the cylinders 73 may be moved to a closed position blocking further flow. Since oil is substantially incompressible, the ply turn-up mechanism 13 will be retained in place despite the pressures which are exerted on the ply turn-up mechanism tending to urge the ply turn-up mechanism axially outward during the ply turn-up operation to be described hereafter.

To inflate the bladders 60 and 61 air under pressure is admitted to the bladders through air lines 75 and 76 connected to passages 77 and 78 in the rings 67 and 69 communicating with the interior of the respective bladders. The bladders 60 and 61 are preferably inflated substantially simultaneously to cause the overhanging edges of the plies P to be wrapped about the bead B and back over the top of the plies onto the drum where the plies are firmly pressed against the drum as shown in FIG. 6. During inflation, the outer bladder 61 engages the ply edges causing them to be wrapped about the bead and pressed against the plies on the drum as aforesaid, and the inner bladder 60 serves to exert a force on the outer bladder 61 causing the same to roll along the top of the drum as disclosed in the aforementioned Cantarutti U.S. Pat. 3,438,832. The ply turn-down fingers 50 may also be positioned adjacent the end of the drum as further shown in the aforementioned Cantarutti patent to provide an additional reaction surface which aids in urging the outer bladder 61 radially outwardly and axially over the end of the drum, but their use is not necessary to obtain proper ply turn-up. Both the ply turn-down mechanism 10 and ply turn-up mechanism 13 may readily be removed from the bearing-mounted sleeve 21 and replaced with different size mechanisms for making different size tires by disconnecting the screws which hold the mechanisms to their respective actuating cylinders.

OPERATION

Now that the various parts of the tire building machine 1 of the present invention have been described, a typical sequence of operation of the machine will be set forth. Initially the tire building drum 4 is collapsed and the outboard assembly 8 is moved axially away from the adjacent end of the drum to permit placement of the tire beads B on the bead rings 12 with the ring segments 33 radially expanded so as not to interfere with such bead placement. The drum 4 is then expanded and the outboard assembly 8 is returned to its axial innermost position shown in FIGS. 1 and 2. Next the ring segments 33 are swung radially inwardly and moved axially into engagement with the ends of the drum 4 by actuation of the small cylinders 44 which hold the ring segments against the end of the drum as shown in FIG. 3. The small cylinders 44 continue to exert a force against the ring segments 33 which maintains the ring segments 33 in the closed cylindrical position and provides sufficient fractional contact between the ring segments and drum end to cause the ring segments to rotate with the drum for application of the desired number of tire plies P to the drum with the edges of the plies overhanging the ends of the drum where they are supported by the ring segments.

In the preferred sequence illustrated in FIGS. 3–8, four plies P are initially wrapped around the drum 4 and ring segments 33 as shown in FIG. 3, but it will be apparent that a greater or lesser number of plies may be applied as desired. During the wrapping of the plies P around the drum 4 and subsequent stitching operation, the ply turn-down fingers 50 remain fully retracted where they are retained in their radial innermost positions by engagement of the rollers 55 on the axial ends of the ply turn-down fingers with the fixed cam 56 as aforesaid. The ply turn-up mechanism 13, on the other hand, may already be positioned adjacent the end of the drum with the outer bladder 61 just slightly inside the end of the drum as shown in FIG. 3 where it is held in place by closing the valve 74 which blocks the oil flow to and from the actuating cylinders 73 for the ply turn-up mechanism.

Following stitching of the plies P, the ring segments 33 are retracted to the FIG. 4 position by actuation of the large tandem cylinders 23, after which the ring segments are expanded radially outwardly to provide clearance for radial outward expansion of the ply turn-down fingers 50 during axial inward movement of the ply turn-down fingers and ring segments. Accurate positioning of the ply turn-down fingers 50 with respect to the adjacent end of the drum is obtained by engagement of the spider support 51 for the ply turn-down fingers with the adjustable stop 55 on the ply turn-up mechanism 13 as aforesaid.

With the ply turn-down fingers 50 in proper position adjacent the end of the drum as shown in phantom lines in FIG. 3, the large tandem cylinders 23 are actuated to move the ply ring mechanism 9 further axially toward the end of the drum during which the rollers 58 on the support ring 25 engage the outer surface of the ply turn-down fingers 50 causing the ply turn-down fingers to swing radially inwardly about their pivots folding the overhanging edges of the plies P evenly over the end of the drum as shown in FIG. 5. The ply ring mechanism 9 continues to move axially inwardly over the end of the drum to set the bead B carried thereby against the end of the drum with the turned-down plies P interposed between the bead and drum end 11. Now the ply ring mechanism 9 and ply turn-down mechanism 10 are retracted and the bladders 60 and 61 are inflated to cause the turned-down edges of the plies P to be wrapped about the bead B and back over the top of the drum where they are firmly pressed in place as shown in FIG. 6. During retraction of the ply ring mechanism 9, the small cylinders 44 cushion the movement of the large tandem cylinders 23 as they approach the end of their stroke. Upon completion of the ply turn-up operation, the inner bladder 60 is deflated to permit the outer bladder 61 to roll back and then the outer bladder 61 is deflated to cause both bladders 60 and 61 to resume their flattened condition shown in FIG. 7 with the outer bladder overlying the inner bladder.

Figure 7:
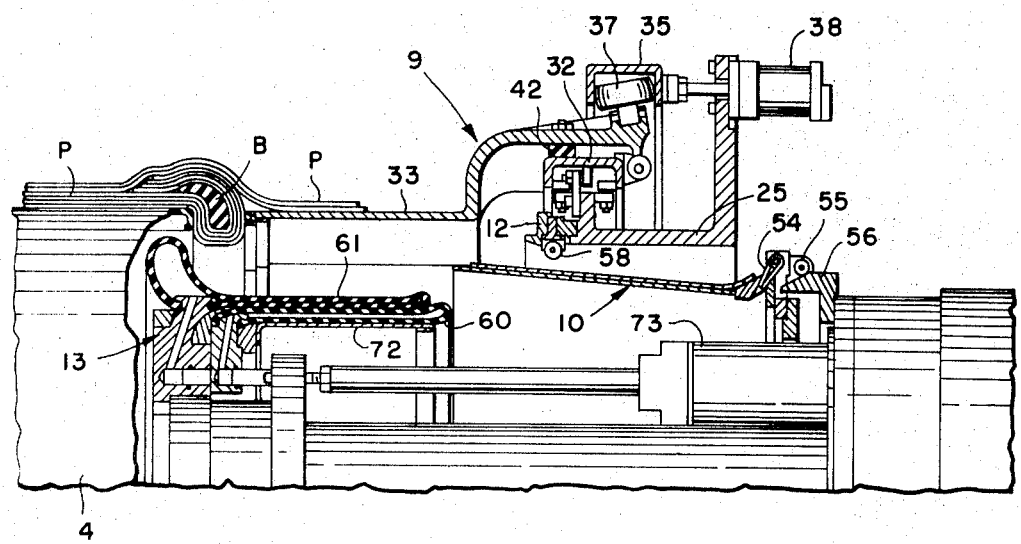
Figure 8:
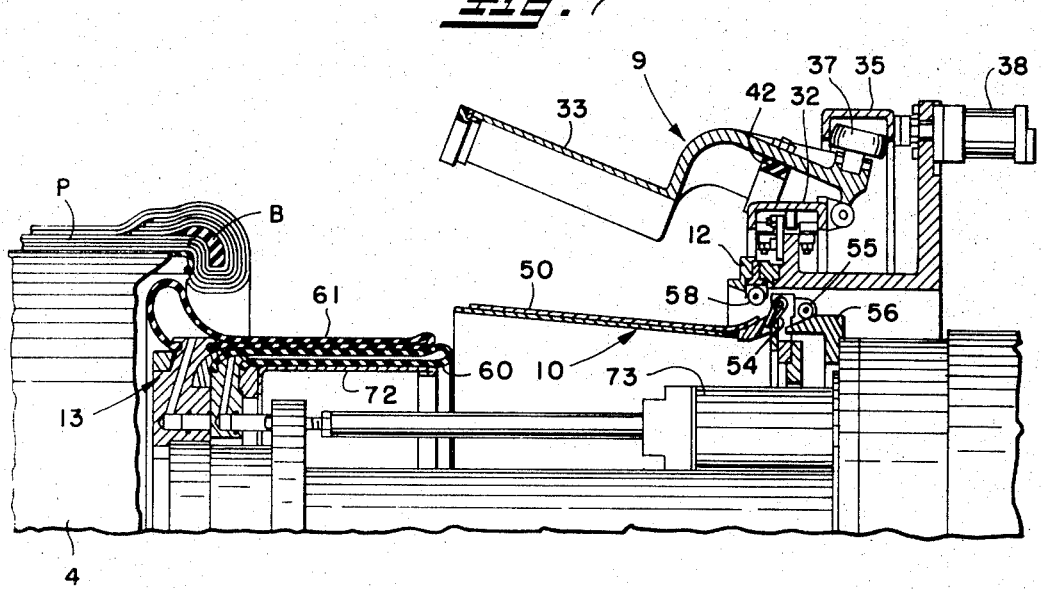

If additional plies P are to be added, the ring segments 33 may again be swung radially inwardly and moved axially inwardly against the previously turned-up plies at the end of the drum as shown in FIG. 7 to provide support for the overhanging edges of the additional plies. In FIG. 7 two additional plies P are shown wrapped around the previously applied plies with the overhanging edges of the additional plies being supported by the closed ring segments for stitching the additional plies together as before. The previously applied plies have the effect of the drum being of a greater diameter than the ring segments 33 when the additional plies are applied, which gives some of the advantages of a shoulder built tire. The additional applied plies may then be turned down and turned under the bead B using an "acorn" tool of the type shown and described in the aforementioned Cantarutti U.S. Pat. 3,438,832 with the ply ring mechanism 9 and ply turn-down mechanism 10 retracted as shown in FIG. 8. After the various additional plies, tire tread stock, and other materials are applied to the tire carcass, the drum is collapsed and the outboard assembly is retracted to permit removal of the finished tire carcass from the machine. Thereafter the operator may place additional tire beads B on the bead rings 12 preparatory to making the next tire carcass.

From the foregoing, it will now be seen that the segmental ply ring mechanism of the present invention fully supports the overhanging ply edges during stitching and yet may readily be moved radially and axially outwardly to provide clearance for the subsequent ply turn-down, bead setting, and ply turn-up operations. The ring segments are also free to rotate with the drum during wrapping of the tire plies therearound, and such ring segments may have a stepped contour to permit storing of tire beads with long flippers therewithin while the ring segments are in position for supporting the overhanging ply edges. Mechanism is also provided for mechanically latching the ply turn-down fingers against radial outward movement in their retracted positions so as not to interfere with axial movements of the ply ring mechanism and bead ring carried thereby. Moreover, all of the the various mechanisms, including the ply ring mechanism, ply turn-down mechanism, and ply turn-up mechanism are supported by a single casting or sleeve member which facilitates removal and replacement of the mechanisms with different size mechanisms for making different size tires as desired.

The embodiments of the invention in which an exclusive property or privilege is claimed are defined as follows:

1. A tire building machine comprising a cylindrical drum adapted to receive a tire ply with the overhanging edges thereof extending beyond the ends of the drum, ply ring mechanism adjacent each end of said drum for supporting the overhanging ply edges, means for turning the ply edges down over the ends of said drum with said ply ring mechanism spaced from the ends of said drum, means for setting tire beads against the ends of said drum with the turned-down ply between the beads and drum end, and means for turning the ply edges upwardly around the beads and against the tire ply on said drum, means mounting said ply ring mechanism for movement toward and away from said drum to provide clearance for the ply turn-down and ply turn-up operations, said ply ring mechanism comprising a plurality of circumferentially spaced ring segments, means mounting said ring segments for radial pivotal movement between a contracted position in which said ring segments provide an annular support for the overhanging ply edges and an expanded position in which said ring segments extend radially outwardly beyond the ends of the drum, and means for pivoting said ring segments between such contracted and expanded positions.

2. The tire building machine of claim 1 wherein said means for setting tire beads against the ends of said drum comprises a bead ring carried by said ply ring mechanisms for axial movement therewith, said bead ring being adapted to support a tire bead within said ring segments, said ring segments in their expanded position providing radial clearance between said ring segments and drum to permit axial movement of said ring segments over the end of said drum during setting of the tire bead against the end of the drum.

3. The tire building machine of claim 2 wherein said ring segments have a stepped contour radially outwardly of said bead ring to provide room for storage of tire beads having large flippers within said ring segments when in their contracted position.

4. The tire building machine of claim 1 wherein the axial innermost edges of said ring segments are movable into and out of frictional engagement with the ends of said drum when in the contracted position, and there are means mounting said ring segments for rotation with said drum when in frictional engagement therewith.

5. The tire building machine of claim 4 further comprising friction pads on the axial innermost edges of said ring segments engageable with the ends of the drum to provide increased friction between said ring segments and the ends of the drum.

6. The tire building machine of claim 4 wherein the pivotal mounts for said ring segments are fixed against radial outward movement and located radially outwardly of the axial inner ends of said ring segments closest to the ends of the drum when contracted, whereby the axially applied force urging said ring segments into frictional engagement with the ends of said drum also urges said ring segments into the contracted position and maintains said ring segments in such contracted position.

7. The tire building machine of claim 1 wherein said means for moving said ply ring mechanism axially comprises first cylinder means for urging said ring segments into frictional engagement with the ends of said drum when said ring segments are contracted, and second cylinder means for moving said ring segments axially inwardly beyond the ends of said drum when said ring segments are expanded.

8. The tire building machine of claim 7 wherein said second cylinder means contains a piston having a rod connected to said ply ring mechanism, and said first cylinder means contains a piston having a rod extending into said second cylinder means for engaging the piston for said second cylinder means, the stroke of the piston for said first cylinder means being selected to correspond to the distance of travel of said ply ring mechanism axially between a retracted position spaced from the ends of the drum and an extended position adjacent the ends of the drum with the innermost edges of said ring segments when contracted pressing against the ends of the drum.

9. The tire building machine of claim 8 wherein said ply ring mechanism is retracted by retraction of the piston for said second cylinder means, said first cylinder means providing a dampening effect on said second cylinder means during retraction thereof.

10. The tire building machine of claim 4 wherein said means mounting said ring segments for rotation with said drum comprises an annular support ring axially movable toward and away from the ends of the drum, and a first guide ring mounted for rotation relative to said support ring, said ring segments being pivotally mounted to said first guide ring for rotation therewith.

11. The tire building machine of claim 10 wherein cam rollers support said first guide ring for rotation relative to said support ring.

12. The tire building machine of claim 10 wherein said means for pivoting said ring segments comprises a second guide ring surrounding said first guide ring, and means mounting said second guide ring for axial movement relative to said first guide ring, said second guide ring having an inwardly opening channel, and said ring segments having cam rollers thereon received in said inwardly opening channel for transmitting axial movements of said second guide ring into pivotal movements of said ring segments.

13. The tire building machine of claim 1 wherein said means for turning the ply edges down over the ends of said drum comprises a plurality of circumferentially spaced pivotally mounted ply turn-down fingers, means urging said ply turn-down fingers radially outwardly about their pivots, means mounting said ply turn-down fingers for axial movement between a retracted position spaced from the ends of said drum and an extended position adjacent the ends of said drum, means for retaining said ply turn-down fingers radially inwardly when in the retracted position so as not to interfere with axial movements of said ply ring mechanism, and means for pivoting said ply turn-down fingers radially inwardly when in the extended position for effecting ply turn-down.

14. The tire building machine of claim 13 wherein said means for retaining said ply turn-down fingers radially inwardly when in the retracted position comprises a stationary cam member engaged by the axial outer ends of said ply turndown fingers when retracted to cause such radial inward pivoting of said ply turn-down fingers.

15. The tire building machine of claim 14 wherein cam rollers are provided on the axial outer ends of said ply turn-down fingers for engagement with said stationary cam member.

16. The tire building machine of claim 1 wherein said means for turning the ply edges upwardly around the beads and against the tire ply on said drum comprises inflatable bladder means, support means for said inflatable bladder means, hydraulic cylinder means for moving said support means axially to properly position said bladder means adjacent the ends of said drum, and valve means for blocking the flow of hydraulic fluid to and from said hydraulic cylinder means to lock said support means against movement.

17. The tire building machine of claim 1 wherein said means for turning the ply edges down over the ends of said drum comprises a plurality of circumferentially spaced pivotally mounted ply turn-down fingers, first support means for said ply turn-down fingers, means for moving said first support means between a retracted position in which said ply turn-down fingers are spaced from the ends of said drum and an extended position in which said ply turn-down fingers are adjacent the ends of said drum, and said means for turning the ply edges upwardly around the beads and against the tire ply on said drum comprises inflatable bladder means, second support means for said inflatable bladder means, and means for moving said second support means axially to position said bladder means adjacent the ends of said drum.

18. The tire building machine of claim 17 wherein said second support means has adjustable stop means thereon for locating said first support means in its extended position.

19. The tire building machine of claim 17 further comprising a bearing mounted sleeve on which said first and second support means are axially slidably received, and cylinder means fixed with respect to said bearing mounted sleeve for moving said first and second support means axially as aforesaid.

References Cited

UNITED STATES PATENTS

| | | | |
|---|---|---|---|
| 3,442,747 | 5/1969 | Brey | 156—131 X |
| 3,438,832 | 4/1969 | Cantaratti | 156—401 |
| 2,455,038 | 11/1948 | Breth | 156—402 |
| 2,614,951 | 10/1952 | Iredell | 156—403 X |
| 3,374,138 | 3/1968 | Porter et al. | 156—400 |
| 2,754,884 | 7/1956 | Jefferys et al. | 156—402 |

DOUGLAS J. DRUMMOND, Primary Examiner

C. B. COSBY, Assistant Examiner

U.S. Cl. X.R.

156—131, 132, 135, 401, 403